US010408144B2

(12) United States Patent
Matsumoto et al.

(10) Patent No.: US 10,408,144 B2
(45) Date of Patent: Sep. 10, 2019

(54) ENGINE CONTROL DEVICE

(71) Applicant: MAZDA MOTOR CORPORATION, Aki-gun, Hiroshima (JP)

(72) Inventors: Tadasuke Matsumoto, Hiroshima (JP); Shouichi Aiga, Hiroshima (JP); Yoshitomo Matsuo, Higashihiroshima (JP); Kazuhiro Nishimura, Higashihiroshima (JP); Tomoaki Fujiyama, Iwakuni (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 15/757,624

(22) PCT Filed: Feb. 3, 2017

(86) PCT No.: PCT/JP2017/004113
§ 371 (c)(1),
(2) Date: Mar. 5, 2018

(87) PCT Pub. No.: WO2017/150076
PCT Pub. Date: Sep. 8, 2017

(65) Prior Publication Data
US 2018/0245529 A1    Aug. 30, 2018

(30) Foreign Application Priority Data
Mar. 4, 2016    (JP) .................................. 2016-042398

(51) Int. Cl.
*F02D 41/00*    (2006.01)
*F02M 26/07*    (2016.01)
(Continued)

(52) U.S. Cl.
CPC .......... *F02D 41/0052* (2013.01); *F02B 37/18* (2013.01); *F02B 37/22* (2013.01);
(Continued)

(58) Field of Classification Search
CPC .. F02D 41/0052; F02D 41/0077; F02D 21/08; F02M 26/01; F02M 26/05;
(Continued)

(56) References Cited

U.S. PATENT DOCUMENTS

2005/0016496 A1*  1/2005  Hitomi ................... F01L 1/053
                                              123/305
2009/0223221 A1*  9/2009  Onishi ................ F02D 41/0065
                                              60/603
(Continued)

FOREIGN PATENT DOCUMENTS

JP    2009250209 A    10/2009
JP    2010024974 A    2/2010
(Continued)

OTHER PUBLICATIONS

ISA Japan Patent Office, International Search Report Issued in PCT Application No. PCT/JP2017/004113, dated Apr. 11, 2017, WIPO, 2 pages.

*Primary Examiner* — Mahmoud Gimie
(74) *Attorney, Agent, or Firm* — Alleman Hall Creasman & Tuttle LLP

(57) ABSTRACT

An engine control device including: a turbocharger; an EGR device that includes an EGR passage, an EGR valve, and an EGR cooler; and a PCM that, based on an operation state of an engine, controls the EGR valve to adjust an EGR rate that is a ratio of an EGR gas amount to a total amount of gas introduced to a cylinder of the engine. The PCM controls the EGR valve such that, in a high load range and a medium load range for the engine, the EGR device recirculates the EGR gas into an intake passage; and controls the EGR valve such that an EGR rate in the high load range is lower than an EGR rate in the medium load range at a same engine speed.

9 Claims, 11 Drawing Sheets

(51) Int. Cl.
*F02P 5/04* (2006.01)
*F02B 37/18* (2006.01)
*F02B 37/22* (2006.01)
*F02M 26/05* (2016.01)
*F02M 26/01* (2016.01)
*F02D 21/08* (2006.01)
*F02M 26/22* (2016.01)
*F02M 26/47* (2016.01)

(52) U.S. Cl.
CPC ......... *F02D 41/0077* (2013.01); *F02M 26/01* (2016.02); *F02M 26/05* (2016.02); *F02M 26/07* (2016.02); *F02P 5/045* (2013.01); *F02D 21/08* (2013.01); *F02M 26/22* (2016.02); *F02M 26/47* (2016.02); *Y02T 10/144* (2013.01)

(58) Field of Classification Search
CPC ........ F02M 26/07; F02M 26/22; F02M 26/47; F02B 37/18; F02B 37/22; F02P 5/045

USPC .......................... 123/568.11, 406.48
See application file for complete search history.

(56) References Cited

U.S. PATENT DOCUMENTS

2013/0139795 A1\* 6/2013 Saitoh .................... F02M 26/49
123/568.16
2015/0053177 A1\* 2/2015 Wooldridge ............ F02D 43/00
123/406.3
2015/0128917 A1\* 5/2015 Surnilla .................. F02D 41/12
123/568.16

FOREIGN PATENT DOCUMENTS

| JP | 2013151897 A | | 8/2013 |
| JP | 2013194635 A | | 9/2013 |
| JP | 2014152640 A | \* | 8/2014 |
| JP | 2015203371 A | | 11/2015 |
| JP | 2015209765 A | | 11/2015 |

\* cited by examiner

ENGINE CONTROL DEVICE

TECHNICAL FIELD

The present invention relates to an engine control device, and particularly to an engine control device having an exhaust gas recirculation (EGR) device that recirculates exhaust gas into an intake passage.

BACKGROUND ART

Conventionally, there has been known a technique for controlling recirculation of EGR gas by an EGR device based on an operating state of an engine, particularly based on an engine speed and an engine load. For example, PTL 1 discloses, relating to an engine control device having an EGR device, increasing an EGR gas amount as the engine speed increases in a high rotation and high load range of the engine; increasing the EGR gas amount as the engine load increases in the high rotation and high load range; and introducing EGR gas in a low rotation and low load range.

CITATION LIST

Patent Literature

PTL 1: JP 2010-24974 A

SUMMARY OF INVENTION

Technical Solution

According to the technique disclosed in the PTL 1 above, the EGR gas amount is increased as the engine speed or the engine load increases in the high rotation and high load range, but this tends to decrease engine output. Typically, as the engine load increases, an ignition timing is retarded to prevent unstable combustion (specifically, to suppress knocking). However, in a high load range in which combustion tends to be unstable as described above, if the EGR gas amount is increased as in the technique described in PTL 1, combustion tends to become more unstable, and torque fluctuation occurs.

The present invention has been made to solve the above-mentioned problems of the prior art, and it is an object of the present invention to provide an engine control device capable of appropriately introducing EGR gas in a high load range while suppressing decrease in engine output and deterioration of combustion stability.

Solution to Problem

In order to achieve the above object, the present invention provides an engine control device including: a turbocharger including a compressor provided on an intake passage and a turbine provided on an exhaust passage; an EGR device including an EGR passage connected to an upstream side of the turbine of the turbocharger and a downstream side of the compressor of the turbocharger to recirculate exhaust gas of the exhaust passage into the intake passage as EGR gas, an EGR valve that regulates an amount of the EGR gas passing through the EGR passage, and an EGR cooler that cools the EGR gas passing through the EGR passage; and an EGR control unit that controls the EGR valve to adjust an EGR rate that is a ratio of an EGR gas amount to a total amount of gas introduced into a cylinder of an engine based on an operating state of the engine. The EGR control unit controls the EGR valve to recirculate the EGR gas into the intake passage with the EGR device in a first region on a high load side of the engine and a second region on a low load side with respect to the first region, and controls the EGR valve such that an EGR rate in the first region is lower than an EGR rate in the second region at a same engine speed.

In the present invention thus configured, the EGR control is performed to introduce the EGR gas at least in the first region on the high load side, and the EGR rate in the first region is made lower than that in the second region at the same engine speed. This enables appropriate suppression of decrease in engine output and deterioration of combustion stability that are caused by the introduction of the EGR gas, by suppressing the EGR rate in the first region to a certain extent (specifically, the EGR rate in the first region is made lower than that in the second region) while appropriately securing the introduction of the EGR gas in the first region on the high load side, and appropriately realizing reduction in a temperature of the engine (such as a temperature between bores) and reduction in fuel increase for suppressing heat damage.

Furthermore, by setting the EGR rate to be higher in the second region on the low load side with respect to the first region, pumping loss can be reliably reduced and fuel efficiency can be effectively improved. In addition, knocking can be suppressed by such introduction of the EGR gas, and as a result, a retarded ignition timing for suppressing knocking can be relieved. That is, the ignition timing can be advanced as compared with a case where EGR gas is not introduced. This also enables improvement of fuel efficiency.

In the present invention, preferably, the EGR control unit controls the EGR valve to recirculate the EGR gas into the intake passage with the EGR device also in a third region on a low load side with respect to the second region, and controls the EGR valve such that an EGR rate in the third region is lower than the EGR rates in the first and second regions at a same engine speed.

According to the present invention thus configured, since the EGR rate is made low in the third region on the low load side, it is possible to appropriately suppress deterioration of combustion stability and emission that may occur when EGR gas is introduced in this third region.

In the present invention, preferably, the EGR control unit controls the EGR valve to be fully closed so as not to recirculate the EGR gas into the intake passage with the EGR device in the third region on the low load side with respect to the second region.

According to the present invention thus configured, it is possible to effectively suppress deterioration of combustion stability and emission that may occur when EGR gas is introduced in the third region.

In the present invention, preferably, the engine control device further includes an ignition control unit that sets an ignition timing to a retard side as an engine load increases, to perform ignition control of the engine.

According to the present invention thus configured, it is possible to appropriately execute the EGR control while suppressing knocking that may occur in the high load range.

In the present invention, preferably, the EGR control unit controls the EGR valve to recirculate the EGR gas into the intake passage with the EGR device in a region on a high load side and a high rotation side of the engine.

According to the present invention thus configured, it is possible to appropriately introduce the EGR gas in the region on the high load side and the high rotation side where it is desirable to introduce the EGR gas. In such a region, it is possible to appropriately realize knock suppression, heat load reduction, reduction in fuel increase, and the like.

In the present invention, preferably, the first region is included in a supercharging range by the turbocharger.

According to the present invention thus configured, it is possible to appropriately introduce the EGR gas in the supercharging range where it is desirable to introduce the EGR gas, and it is possible to appropriately realize knock suppression, heat load reduction, reduction in fuel increase, and the like in the supercharging range.

Advantageous Effect of Invention

According to the engine control device of the present invention, it is possible to appropriately introduce the EGR gas in the high load range while suppressing decrease in engine output and deterioration of combustion stability.

DESCRIPTION OF EMBODIMENTS

Hereinafter, an engine control device according to an embodiment of the present invention will be described with reference to the accompanying drawings.

<System Configuration>

Figure 1:
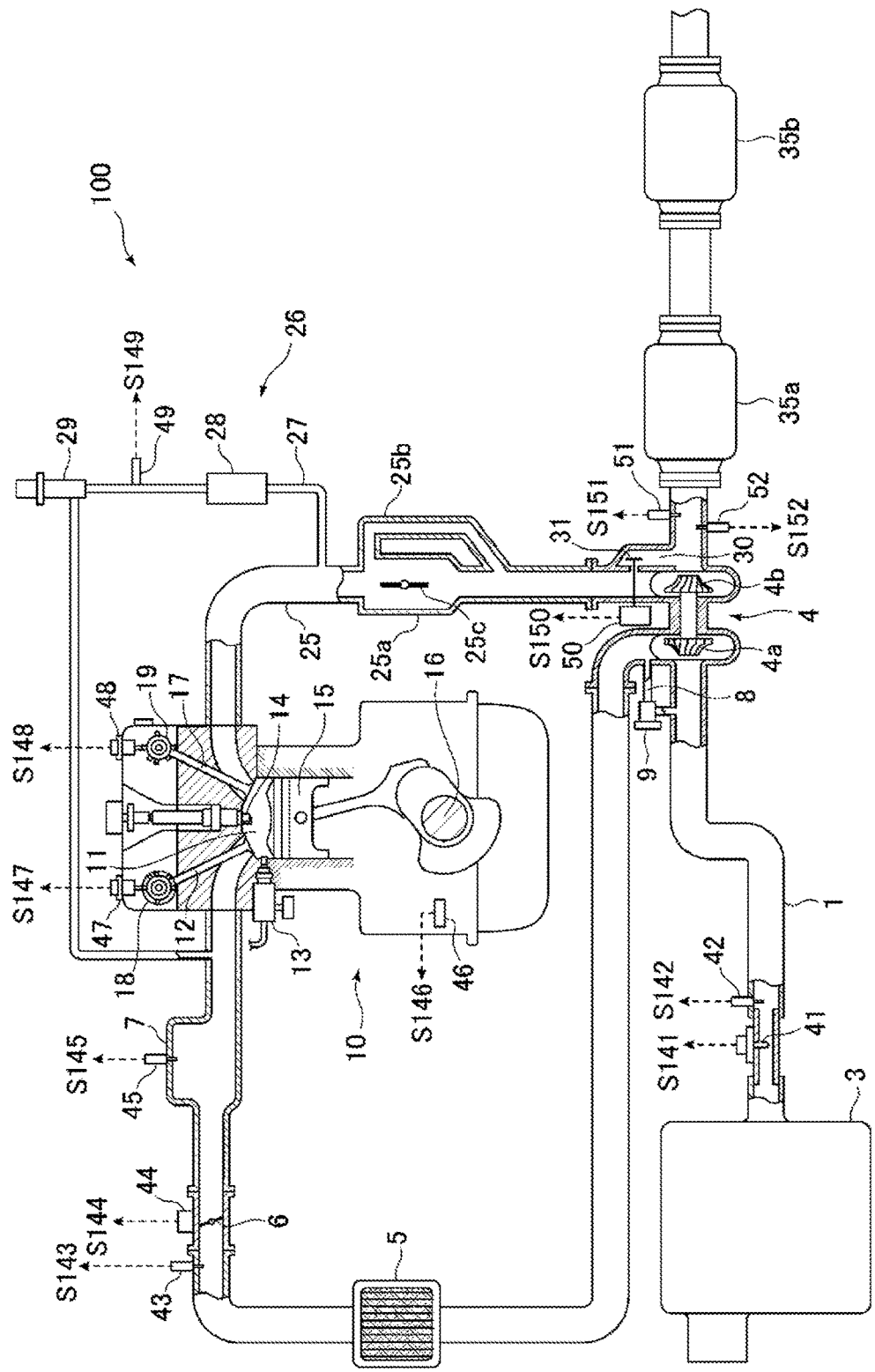
FIG. 1 is a schematic configuration view of an engine system applied with an engine control device according to an embodiment of the present invention.

First, with reference to FIGS. 1 and 2, an engine system applied with an engine control device according to an embodiment of the present invention will be described. FIG. 1 is a schematic configuration view of an engine system applied with an engine control device according to an embodiment of the present invention, and FIG. 2 is a block diagram showing an electrical configuration of an engine control device according to an embodiment of the present invention.

Figure 2:
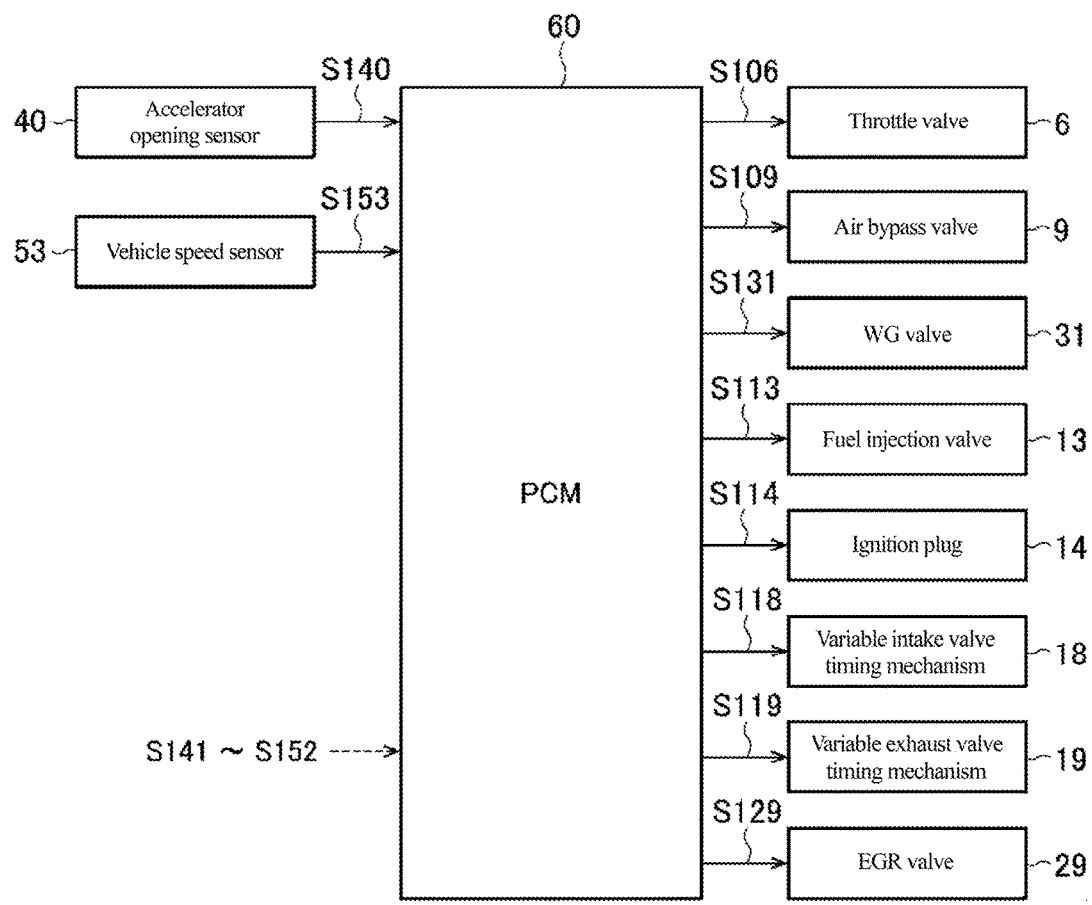
FIG. 2 is a block diagram showing an electrical configuration of an engine control device according to an embodiment of the present invention.

As shown in FIGS. 1 and 2, an engine system 100 mainly includes an intake passage 1 through which intake air (air) introduced from an outside passes; an engine 10 (specifically, a gasoline engine) that generates power of a vehicle by burning an air-fuel mixture of the intake air supplied from the intake passage 1 and fuel supplied from a fuel injection valve 13 to be described later; an exhaust passage 25 to discharge exhaust gas generated by the combustion in the engine 10; sensors 40 to 53 that detect various states relating to the engine system 100; and a PCM 60 that controls the entire engine system 100.

In the intake passage 1, in order from the upstream side, there are provided an air cleaner 3 that purifies intake air that is introduced from the outside; a compressor 4a of a turbocharger 4 to increase a pressure of the intake air passing through; an intercooler 5 that cools the intake air with outside air or cooling water; a throttle valve 6 that adjusts an amount of the intake air passing through (intake air amount); and a surge tank 7 that temporarily stores intake air to be supplied to the engine 10.

In the intake passage 1, there is also provided an air bypass passage 8 that is to recirculate a part of the intake air supercharged by the compressor 4a to the upstream side of the compressor 4a. Specifically, one end of the air bypass passage 8 is connected to the intake passage 1 on the downstream side of the compressor 4a and on the upstream side of the throttle valve 6, while another end of the air bypass passage 8 is connected to the intake passage 1 on the downstream side of the air cleaner 3 and on the upstream side of the compressor 4a.

The air bypass passage 8 is provided with an air bypass valve 9 that adjusts a flow rate of the intake air flowing through the air bypass passage 8, with an opening and closing operation. The air bypass valve 9 is a so-called on-off valve that can be switched between a closed state in which the air bypass passage 8 is completely closed, and an opened state in which the air bypass passage 8 is completely opened.

The engine 10 mainly includes an intake valve 12 that introduces intake air supplied from the intake passage 1 into a combustion chamber 11; the fuel injection valve 13 that injects fuel toward the combustion chamber 11; an ignition plug 14 that ignites an air-fuel mixture of the intake air and fuel supplied into the combustion chamber 11; a piston 15 that reciprocates with combustion of the air-fuel mixture in the combustion chamber 11; a crankshaft 16 that is rotated by the reciprocating motion of the piston 15; and an exhaust valve 17 that discharges exhaust gas generated by the combustion of the air-fuel mixture in the combustion chamber 11 to the exhaust passage 25.

In addition, in the engine 10, operation timings (i.e., opening/closing timings) of the intake valve 12 and the exhaust valve 17 are variable respectively by a variable intake valve timing mechanism 18 and a variable exhaust valve timing mechanism 19, as a variable valve timing mechanism. As the variable intake valve timing mechanism 18 and the variable exhaust valve timing mechanism 19, various publicly known types can be applied. For example, it is possible to change the operation timings of the intake valve 12 and the exhaust valve 17 by using an electromagnetically or hydraulically configured mechanism.

In the exhaust passage 25, in order from the upstream side, there are provided a turbine 4b of the turbocharger 4, which is rotated by the passing exhaust gas to drive the compressor 4*a* with this rotation, and exhaust purification catalysts 35*a* and 35*b* having a function for purifying exhaust gas such as a NOx catalyst, a three-way catalyst, and an oxidation catalyst, for example.

Further, on the exhaust passage 25, there is provided an EGR device 26 that recirculates a part of the exhaust gas as EGR gas into the intake passage 1. The EGR device 26 includes: an EGR passage 27 having one end connected to the exhaust passage 25 on the upstream side of the turbine 4*b*, and another end connected to the intake passage 1 on the downstream side of the compressor 4*a* and on the downstream side of the throttle valve 6; an EGR cooler 28 that cools the EGR gas; and an EGR valve 29 that controls an amount of the EGR gas (flow rate) flowing through the EGR passage 27. This EGR device 26 corresponds to a so-called high pressure EGR device (high pressure loop (HPL) EGR device).

The exhaust passage 25 is provided with a turbine bypass passage 30 that detours the exhaust gas without passing through the turbine 4*b* of the turbocharger 4. The turbine bypass passage 30 is provided with a waste gate valve (hereinafter referred to as a "WG valve") 31 that controls the flow rate of the exhaust gas flowing through the turbine bypass passage 30.

In the exhaust passage 25, a passage between a connecting part on the upstream side of the EGR passage 27 and a connecting part on the upstream side of the turbine bypass passage 30 is branched into a first passage 25*a* and a second passage 25*b*. The first passage 25*a* has a larger diameter than that of the second passage 25*b*, in other words, the second passage 25*b* has a smaller diameter than that of the first passage 25*a*. The first passage 25*a* is provided with an on-off valve 25*c*. When the on-off valve 25*c* is open, the exhaust gas basically flows into the first passage 25*a*, and when the on-off valve 25*c* is closed, the exhaust gas flows only to the second passage 25*b*. Therefore, when the on-off valve 25*c* is closed, a flow velocity of the exhaust gas becomes higher as compared to when the on-off valve 25*c* is open. The on-off valve 25*c* is closed in a low rotational speed region, and supplies the exhaust gas with the increased flow velocity to the turbine 4*b* of the turbocharger 4, to enable supercharging by the turbocharger 4 even in the low rotational speed region.

The engine system 100 is provided with the sensors 40 to 53 that detect various states relating to the engine system 100. Specifically, these sensors 40 to 53 are as follows. An accelerator opening sensor 40 detects an accelerator opening degree, which is an opening degree of an accelerator pedal (corresponding to an amount of depression of the accelerator pedal by the driver). An air flow sensor 41 detects an intake air amount corresponding to a flow rate of intake air passing through the intake passage 1 between the air cleaner 3 and the compressor 4*a*. A temperature sensor 42 detects a temperature of intake air passing through the intake passage 1 between the air cleaner 3 and the compressor 4*a*. A pressure sensor 43 detects a supercharging pressure. A throttle opening sensor 44 detects a throttle opening degree, which is an opening degree of the throttle valve 6. A pressure sensor 45 serves as a downstream pressure detector and detects an intake manifold pressure (corresponding to an EGR valve downstream pressure), which is a pressure of intake air supplied to the engine 10. A crank angle sensor 46 detects a crank angle on the crankshaft 16. An intake-side cam angle sensor 47 detects a cam angle of an intake camshaft. An exhaust-side cam angle sensor 48 detects a cam angle of an exhaust cam shaft. A pressure sensor 49 serves as an upstream pressure detector and detects a pressure of gas on the upstream side of the EGR valve 29, specifically, detects a pressure of the EGR gas (EGR valve upstream pressure) between the EGR cooler 28 and the EGR valve 29. AWG opening sensor 50 detects an opening degree of the WG valve 31. An 02 sensor 51 detects an oxygen concentration in exhaust gas. An exhaust temperature sensor 52 detects an exhaust temperature. A vehicle speed sensor 53 detects a speed of the vehicle (vehicle speed). These various sensors 40 to 53 respectively output detection signals S140 to S153 corresponding to the detected parameters, to the PCM 60.

The PCM 60 controls components in the engine system 100 based on the detection signals S140 to S153 input from the various sensors 40 to 53 described above. Specifically, as shown in FIG. 2, the PCM 60 supplies a control signal S106 to the throttle valve 6 to control the opening/closing timing and the throttle opening degree of the throttle valve 6; supplies a control signal S109 to the air bypass valve 9 to control the opening and closing of the air bypass valve 9; supplies a control signal S131 to the WG valve 31 to control the opening degree of the WG valve 31; supplies a control signal S113 to the fuel injection valve 13 to control the fuel injection amount and the fuel injection timing; supplies a control signal S114 to the ignition plug 14 to control the ignition timing; supplies control signals S118 and S119 respectively to the variable intake valve timing mechanism 18 and the variable exhaust valve timing mechanism 19 to control the operation timings of the intake valve 12 and the exhaust valve 17; and supplies a control signal S129 to the EGR valve 29 to control the opening degree of the EGR valve 29 (hereinafter, this control is appropriately referred to as "EGR control").

Each of these components of the PCM 60 is configured by a computer including: a CPU; various programs interpreted and executed on the CPU (including basic control program such as an OS, and an application program activated on the OS to achieve a specific function); and an internal memory such as a ROM and a RAM to store programs and various data.

Although details will be described later, the PCM 60 serves as an "EGR control unit" and an "ignition control unit" in the present invention.

<Engine Control Process>

Figure 3:
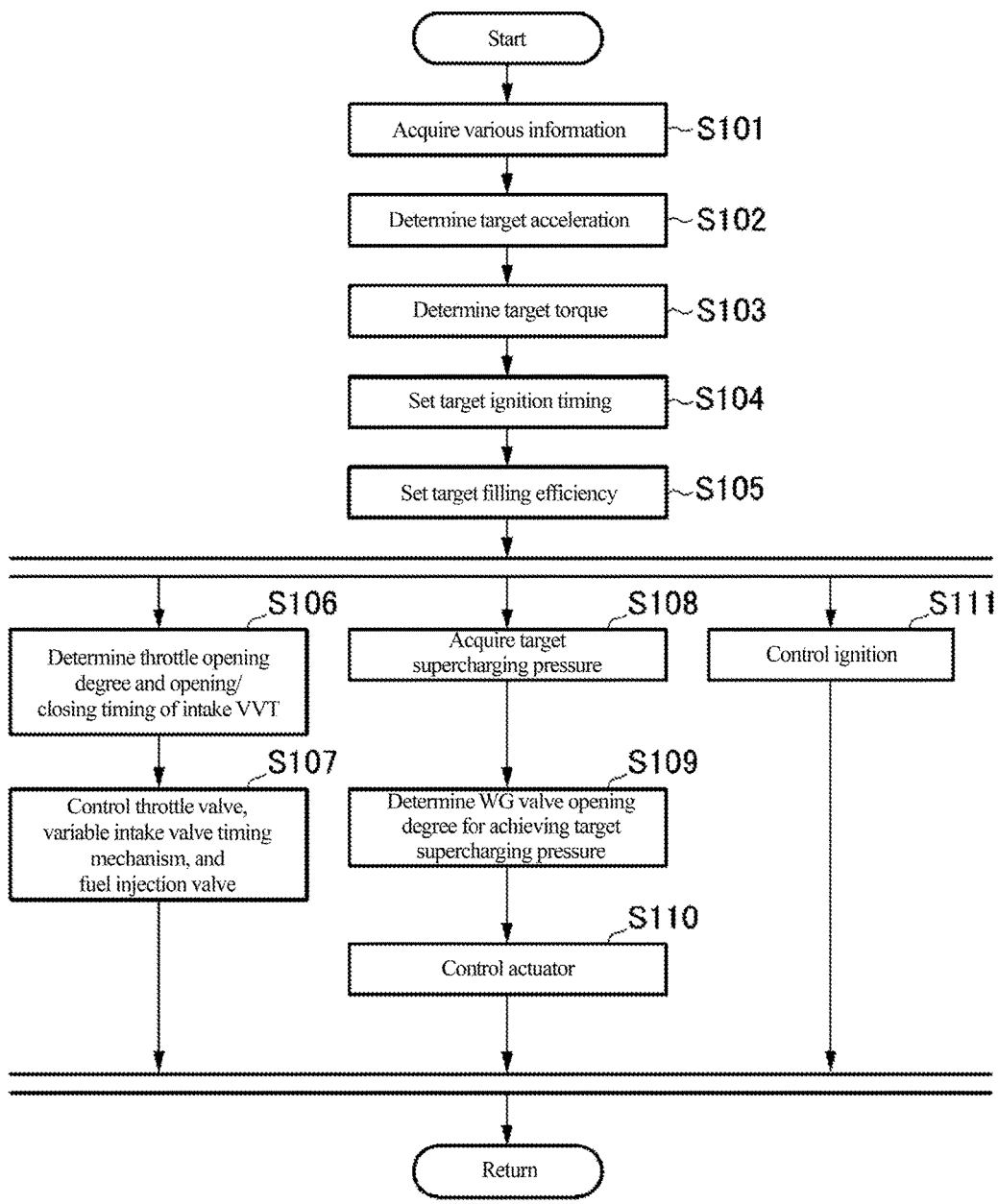
FIG. 3 is a flowchart showing an engine control process according to an embodiment of the present invention.

Next, with reference to FIG. 3, an engine control process according to an embodiment of the present invention will be described. FIG. 3 is a flowchart showing an engine control process according to an embodiment of the present invention. This flow is started when an ignition of the vehicle is turned on and the PCM 60 is powered on, and the flow is repeatedly executed at a predetermined cycle.

When the engine control process is started, in step S101, the PCM 60 acquires various information in the vehicle. Specifically, the PCM 60 acquires an accelerator opening degree detected by the accelerator opening sensor 40; a vehicle speed detected by the vehicle speed sensor 53; an engine speed corresponding to a crank angle detected by the crank angle sensor 46; a gear stage currently set in a transmission of the vehicle, and the like.

Next, in step S102, the PCM 60 sets a target acceleration based on the operating state of the vehicle acquired in step S101. Specifically, from acceleration characteristic maps (prepared in advance and stored in the memory or the like) defining various vehicle speeds and various gear stages, the PCM 60 selects an acceleration characteristic map corresponding to the current vehicle speed and gear stage, and refers to the selected acceleration characteristic map to determine the target acceleration corresponding to the accelerator opening degree detected by the accelerator opening sensor 40.

Next, in step S103, the PCM 60 determines a target torque of the engine 10 for achieving the target acceleration determined in step S102. In this case, the PCM 60 determines the target torque within a range of the torque that can be output by the engine 10, based on the current vehicle speed and gear stage, a road surface gradient, a road surface μ, and the like.

Next, in step S104, the PCM 60 sets a target ignition timing of the ignition plug 14, according to the operating state of the engine 10 including the current engine speed acquired in step S101 and the target torque determined in step S103. For example, the PCM 60 calculates a target indicated torque by adding a loss torque due to friction loss and pumping loss to the target torque; selects an ignition timing map (ignition advance map) for achieving the target indicated torque which corresponds to the current engine speed and is near the MBT, from ignition timing maps defining a relationship between an ignition timing and an indicated torque for various filling efficiencies and various engine speeds; and refers to the selected ignition timing map to set the target ignition timing corresponding to the target indicated torque. Further, when knocking is occurring, the PCM 60 corrects the set target ignition timing to a retard side.

Figure 4:
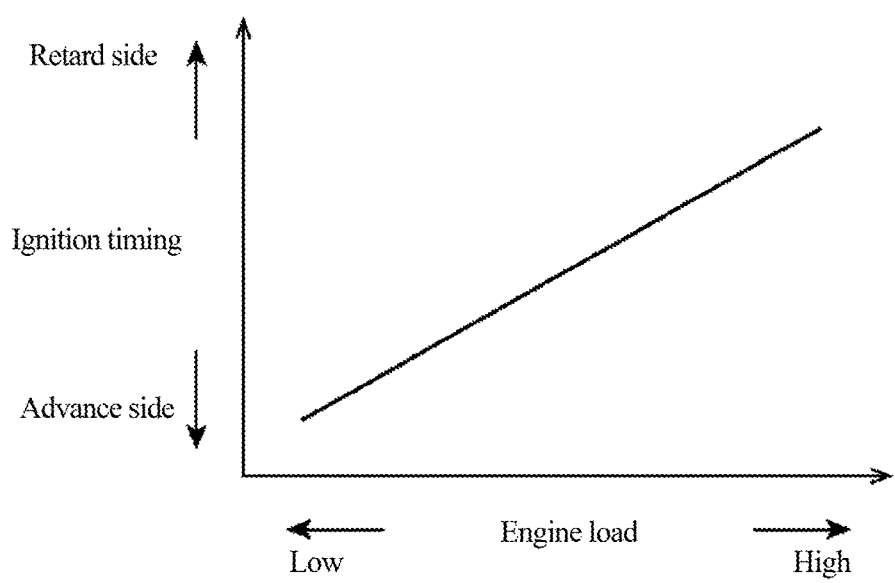
FIG. 4 is a graph schematically showing an example of an ignition timing map according to an embodiment of the present invention.

Here, an example of the ignition timing map according to an embodiment of the present invention will be described with reference to FIG. 4. FIG. 4 is a graph schematically showing the ignition timing map according to an embodiment of the present invention, which is defined for knock suppression as a main purpose. In FIG. 4, a horizontal axis indicates an engine load, and a vertical axis indicates an ignition timing defined from the viewpoint of knock suppression. As an engine load increases, knocking tends to occur more easily. Therefore, in the ignition timing map shown in FIG. 4, the ignition timing is defined to be set on the retard side as the engine load increases.

Returning to FIG. 3, the description is continued. In step S105, the PCM 60 sets a target filling efficiency for causing the engine 10 to output the target torque determined in step S103. Specifically, the PCM 60 obtains a required mean effective pressure necessary for outputting the above-described target indicated torque, and obtains a heat quantity (required heat quantity) corresponding to this required mean effective pressure. Then, depending on a magnitude relation between thermal efficiency (reference thermal efficiency) under a condition set for the target ignition timing above and thermal efficiency (actual thermal efficiency) according to an actual operating condition of the engine 10, the PCM 60 obtains the target filling efficiency based on either the reference thermal efficiency or the actual thermal efficiency, and based on the required heat quantity. Note that the PCM 60 may appropriately limit the target filling efficiency obtained in this manner, in accordance with the required mean effective pressure or the like.

Subsequently, in step S106, the PCM 60 determines the opening degree of the throttle valve 6 and the opening/closing timing of the intake valve 12 via the variable intake valve timing mechanism 18 in consideration of the air amount detected by the air flow sensor 41, so as to introduce air corresponding to the target filling efficiency set in step S105, into the engine 10.

Next, in step S107, the PCM 60 controls the throttle valve 6 and the variable intake valve timing mechanism 18 based on the throttle opening degree and the opening/closing timing of the intake valve 12 that have been determined in step S106, and the PCM 60 controls the fuel injection valve 13 based on a target equivalence ratio determined according to the operating state of the engine 10 and the like, and based on an actual air amount estimated based on the air amount or the like detected by the air flow sensor 41.

In step S108, in parallel with the processes in steps S106 to S107, the PCM 60 acquires a target supercharging pressure by the turbocharger 4. For example, the memory or the like stores in advance a map in which the target supercharging pressure to be set is associated with the engine speed, the engine load, the target torque, and the like, and the PCM 60 refers to the map to acquire the target supercharging pressure corresponding to the current engine speed and engine load, the target torque, and the like. In such a map of the target supercharging pressure, the target supercharging pressure is defined such that the turbocharger 4 performs supercharging at least in the high load range of the engine 10.

Next, in step S109, the PCM 60 determines the opening degree of the WG valve 31 for achieving the target supercharging pressure acquired in step S108.

Next, in step S110, the PCM 60 controls an actuator of the WG valve 31 based on the opening degree that has been set in step S109. In this case, the PCM 10 controls the actuator of the WG valve 31 according to the opening degree that has been set in step S109, and performs feedback control of the actuator such that the supercharging pressure detected by the pressure sensor 43 approaches the target supercharging pressure acquired in step S108.

In step S111, in parallel with the processes of steps S106 and S107 and steps S108 to S110, the PCM 60 controls the ignition plug 14 to cause ignition at the target ignition timing set in step S104.

<EGR Control Process>

Figure 5:
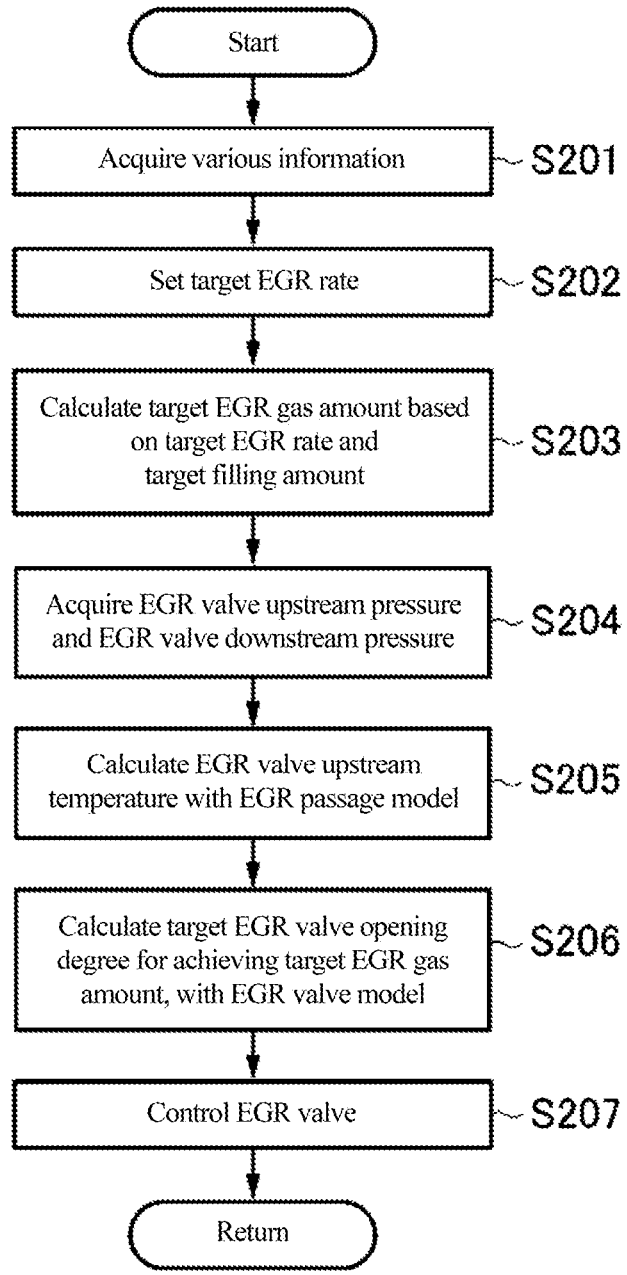
FIG. 5 is a flowchart showing an EGR control process according to an embodiment of the present invention.

Next, with reference to FIG. 5, a process for controlling the recirculation of EGR gas with the EGR device 26 (EGR control process) in an embodiment of the present invention will be described. In this EGR control process, the opening degree of the EGR valve 29 is controlled to achieve a target EGR rate (uniquely corresponds to the target EGR gas amount) according to the operating state of the engine 10. FIG. 5 is a flowchart showing the EGR control process according to an embodiment of the present invention. This EGR control process is repeatedly executed at predetermined intervals by the PCM 60, and is executed in parallel with the engine control process shown in FIG. 3. The above-described EGR rate is a ratio of an EGR gas amount to a total amount of gas (including fresh air and EGR gas) introduced into the cylinder of the engine 10.

First, in step S201, the PCM 60 acquires various information in the vehicle. Specifically, the PCM 60 acquires an engine speed corresponding to the crank angle detected by the crank angle sensor 46, an engine load corresponding to the intake air amount detected by the air flow sensor 41, and the like. In addition, the PCM 60 also acquires an EGR gas amount obtained when the flow has been previously executed.

Next, in step S202, the PCM 60 sets a target EGR rate according to the engine speed and the engine load acquired in step S201. Specifically, the PCM 60 refers to a map (EGR rate map) defining in advance an EGR rate to be set for the engine speed and the engine load, to set an EGR rate corresponding to the engine speed and the engine load acquired in step S201, as the target EGR rate. The EGR rate map will be described in detail in a later section.

Next, in step S203, the PCM 60 calculates a target EGR gas amount (flow rate) based on the target EGR rate set in step S202, and a target filling amount (corresponding to the target filling efficiency set in step S105 in FIG. 3). Specifically, the PCM 60 calculates the target EGR gas amount by multiplying the target EGR rate and the target filling amount.

Next, in step S204, the PCM 60 acquires the EGR valve downstream pressure (corresponding to the intake manifold pressure), which is a pressure of gas on the downstream side of the EGR valve 29 and detected by the pressure sensor 45, and acquires the EGR valve upstream pressure, which is a pressure of gas on the upstream side of the EGR valve 29 and detected by the pressure sensor 49.

Next, in step S205, the PCM 60 uses an EGR passage model in which pressure loss, heat exchange, and transport delay on the EGR passage 27 are modeled, to calculate an EGR valve upstream temperature, which is a temperature of gas on the upstream side of the EGR valve 29, specifically, which is a temperature of the EGR gas on the downstream side of the EGR cooler 28 and directly upstream of the EGR valve 29. This EGR passage model will be described in detail with reference to FIG. 6 later.

Subsequently, in step S206, the PCM 60 uses an EGR valve model, which is defined according to Bernoulli equation of compressible fluid, and which is a model for predicting the EGR gas amount (flow rate) based on the EGR valve downstream pressure, the EGR valve upstream pressure, the EGR valve opening degree, and the like, to calculate a target EGR valve opening degree for achieving the target EGR gas amount calculated in step S203, based on the EGR valve downstream pressure and the EGR valve upstream pressure acquired in step S204 and the EGR valve upstream temperature calculated in step S205. This EGR passage model will also be described in detail with reference to FIG. 6 later.

Next, in step S207, the PCM 60 controls the EGR valve 29 to set to the target EGR valve opening degree calculated in step S206.

Figure 6:
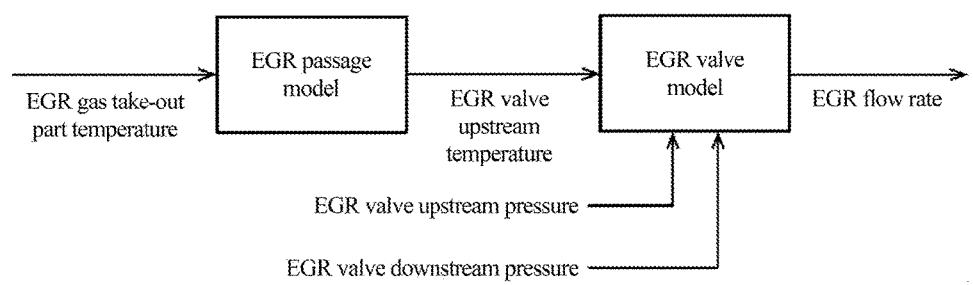
FIG. 6 is a block diagram schematically showing an EGR passage model and an EGR valve model according to an embodiment of the present invention.

Next, with reference to FIG. 6, the above-described EGR passage model and EGR valve model will be specifically described. FIG. 6 is a block diagram schematically showing the EGR passage model and the EGR valve model according to an embodiment of the present invention.

As shown in FIG. 6, the PCM 60 firstly calculates the EGR valve upstream temperature by using the EGR passage model including a pressure loss model, a heat exchange model, and a transport delay model on the EGR passage 27. In particular, the PCM 60 calculates the EGR valve upstream temperature from a temperature at a portion where the EGR gas is extracted by the EGR passage 27 (EGR gas extraction part temperature), by using the heat exchange model as the EGR passage model. This heat exchange model is obtained by modeling a phenomenon in which, when the EGR gas flows through the EGR passage 27, heat is transferred from a wall surface of the EGR passage 27 to the outside (cooling water or air), lowering the temperature of the EGR gas. Further, this heat exchange model is defined for each of paths obtained by dividing the EGR passage 27 into a plurality of paths from the viewpoint of a difference in a form of heat transfer (such as a difference in a heat transfer coefficient). Using such a heat exchange model, the PCM 60 calculates the EGR valve upstream temperature based on the EGR gas extraction part temperature, an outside air temperature, a cooling water temperature, and the like. For example, the heat exchange model is expressed by the following Equation (1).

$$T_{h2} = T_c + (T_{h1} - T_c) \cdot e^{\frac{1}{G_h c_h} AU} \quad \text{Equation (1)}$$

In Equation (1), "$T_{h1}$" is an EGR gas extraction part temperature, "$T_{h2}$" is an EGR valve upstream temperature, "$T_c$" is a temperature of fluid that exchanges heat with the EGR gas passing through the EGR passage 27 (the outside air temperature, the cooling water temperature, or the like), "AU" is a heat transfer coefficient (which can be obtained in advance by calibration or the like), "$G_h$" is an EGR gas amount (flow rate), and "$c_h$" is a specific heat of the EGR gas. As the EGR gas extraction part temperature, for example, an exhaust temperature estimated by a predetermined model is used.

Next, the PCM 60 uses the EGR valve model defined according to Bernoulli equation of compressible fluid, to calculate the target EGR valve opening degree for achieving the target EGR gas amount, based on the detected EGR valve downstream pressure and EGR valve upstream pressure, and the EGR valve upstream temperature calculated from the above EGR passage model. For example, the EGR valve model is expressed by the following Equation (2).

$$\dot{m}_{egr} = CdA\sqrt{2 \cdot \rho_{up} \cdot P_{up}} \cdot \Psi\left(\frac{P_{down}}{P_{up}}\right) \quad \text{Equation (2)}$$

$$\Psi\left(\frac{P_{down}}{P_{up}}\right) = \left(\frac{P_{down}}{P_{up}}\right)^{\frac{1}{\kappa}} \cdot \sqrt{\frac{2\kappa}{\kappa-1} \cdot \left\{1 - \left(\frac{P_{down}}{P_{up}}\right)^{\frac{\kappa-1}{\kappa}}\right\}} \quad \text{Equation (3)}$$

In Equation (2), "$\dot{m}_{egr}$" is an EGR gas amount (a mass flow rate).

Further, "$P_{up}$" is an EGR valve upstream pressure, "$P_{down}$" is an EGR valve downstream pressure, "$\rho_{up}$" is a density of the EGR gas on the upstream side of the EGR valve 29, this density is a value corresponding to the EGR valve upstream temperature, and CdA is a value obtained by multiplying a flow coefficient of the EGR passage 27 and a passage area and is a value corresponding to the EGR valve opening degree. Further, a function "$\psi$" in Equation (2) is expressed by Equation (3). In Equation (3), "$\kappa$" is a specific heat ratio (physical property value). The density $\rho_{up}$ in Equation (2) may be obtained from the detected EGR valve upstream pressure $P_{up}$ and the estimated EGR valve upstream temperature, using a gas state equation, for example.

The PCM 60 obtains "CdA" by substituting: the detected EGR valve upstream pressure and EGR valve downstream pressure; the EGR gas density according to the EGR valve upstream temperature obtained by the EGR passage model (heat exchange model); and the target EGR gas amount according to the target EGR rate set from the EGR rate map, into Equation (2), to calculate the target EGR valve opening degree to be set from this "CdA".

As described above, in the present embodiment, EGR control is performed based on the EGR gas amount as a physical quantity. That is, in the present embodiment, the EGR valve 29 is subjected to feedforward control by using a physical model (EGR valve model) showing a relationship between the EGR gas amount and the EGR valve opening degree. According to the present embodiment as described above, by defining in advance a relationship between the operating state of the engine 10 and the EGR valve opening degree to be set, and by, according to such a relationship, comparing with a method of a comparative example for controlling the EGR valve opening degree to correspond to the current operating state of the engine 10, controllability of the EGR rate (EGR gas amount) and robustness against disturbance can be improved. For example, at high altitude or during transient time, in the method of the comparative example, deviation occurs in the EGR valve upstream pressure, the EGR valve downstream pressure, and the EGR valve upstream temperature when the relationship between the operating state of the engine 10 and the EGR valve opening degree to be set is defined, which prevents proper achievement of the target EGR rate. However, according to the present embodiment, since the EGR valve upstream pressure and the EGR valve downstream pressure are detected and the EGR valve upstream temperature is estimated to control the EGR valve opening degree, the target EGR rate can be properly achieved. Further, according to the present embodiment, cooperative control between the EGR control and other control can be appropriately performed. Specifically, since the EGR gas amount can be appropriately grasped, it is possible to accurately perform an intake air amount control and a fuel injection control in consideration of the EGR gas amount.

<EGR Rate Map>

Next, the EGR rate map according to an embodiment of the present invention will be described. This EGR rate map is a map associated with the EGR rate to be set according to the engine speed and the engine load, and is referred to in setting the target EGR rate in step S202 in the EGR control process of FIG. 5. Hereinafter, a typical tendency of the relationship between the engine speed and the EGR rate and between the engine load and the EGR rate, which is defined in the EGR rate map, will be described.

Figure 7:
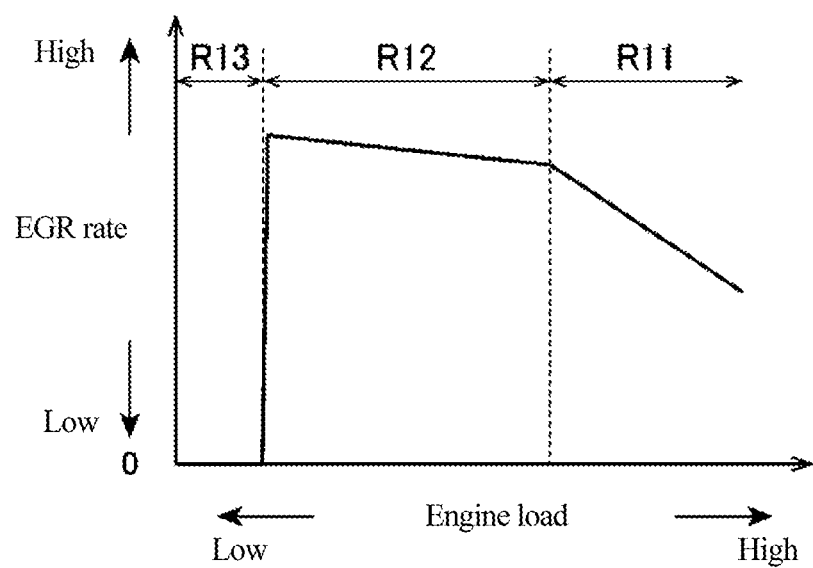
FIG. 7 is a graph showing a relationship between an engine load and an EGR rate when viewed with a same engine speed, relating to an EGR rate map according to an embodiment of the present invention.

First, with reference to FIG. 7, the relationship between the engine load and the EGR rate, which is defined in the EGR rate map according to an embodiment of the present invention, will be described. FIG. 7 is a graph showing the relationship between the engine load (horizontal axis) and the EGR rate (vertical axis) when viewed with a same engine speed, relating to the EGR rate map.

As shown in FIG. 7, in the present embodiment, the EGR rate map is defined such that, in a high load range R11 (first region) and a medium load range R12 (second region) on a low load side with respect to the high load range R11, the EGR rate is set to a value larger than 0, and the EGR gas is introduced by the EGR device 26. Further, the EGR rate map is defined such that the EGR rate becomes lower in the high load range R11 than in the medium load range R12 when viewed at a same engine speed. This high load range R11 is included in the supercharging range by the turbocharger 4. On the other hand, the EGR rate map is defined such that, in a low load range R13 (third region) on the low load side with respect to the medium load range R12, the EGR rate is set to substantially 0 and the EGR gas is not introduced by the EGR device 26.

The reason for defining the EGR rate map as shown in FIG. 7 is as follows. Basically, introducing the EGR gas increases an intake pressure (intake manifold pressure) and decreases an exhaust pressure, enabling reduction of pumping loss and improvement of fuel efficiency. In addition, introducing the EGR gas in the high load range can lower a temperature of a compressed air-fuel mixture of the engine 10 with the cooled EGR gas, and can suppress knocking. Furthermore, introducing the EGR gas in the high load range can lower a combustion temperature with the cooled EGR gas, to lower the temperature of the engine 10 (in particular, a temperature between bores (a member between cylinders) of the engine 10). In addition, introducing the EGR gas in the high load range lowers an exhaust temperature, enabling reduction in increase in a fuel injection amount for suppressing heat damage in the engine 10.

From this, introducing the EGR gas in the high load range is considered to be desirable. However, while the ignition timing is retarded to suppress knocking (see FIG. 4) as the engine load increases, if a large amount of the EGR gas is introduced in such a high load range where combustion tends to be unstable, the combustion tends to become more unstable and torque fluctuation occurs. In addition, since an air-fuel ratio is made rich in the high load and high rotation range, the combustion tends to become further unstable. Therefore, in the present embodiment, although the EGR gas is introduced in the high load range R11, the amount of the EGR gas introduced in the high load range R11 is limited to some extent. Specifically, in the high load range R11, the EGR rate is made lower than that in the medium load range R12 (see FIG. 7).

This enables appropriate suppression of decrease in engine output and deterioration of combustion stability that are caused by the introduction of the EGR gas, by suppressing the EGR gas amount in the high load range R11 to a certain extent (specifically, the EGR rate in the high load range R11 is made lower than that in the medium load range R12) while appropriately securing the introduction of the EGR gas in the high load range R11, and appropriately realizing reduction in a temperature of the engine 10 (such as a temperature between the bores) and reduction in fuel increase for suppressing heat damage. Furthermore, introducing a relatively large amount of the EGR gas in the medium load range R12 enables reliable reduction of pumping loss and effective improvement of fuel efficiency. In addition, knocking can be suppressed by such introduction of the EGR gas, and as a result, a retarded ignition timing for suppressing knocking can be relieved. That is, the ignition timing can be advanced as compared with a case where EGR gas is not introduced. This also enables improvement of fuel efficiency.

On the other hand, from the viewpoint of advantage of introducing the EGR gas as described above, in the present embodiment, also in the supercharging range by the turbocharger 4, the EGR gas is introduced to obtain effects such as knock suppression, heat load reduction, and reduction in fuel increase, in particular. In the present embodiment, since supercharging by the turbocharger 4 is performed at least in the high load range, and the supercharging range by the turbocharger 4 includes the above-described high load range R11, the EGR gas is introduced according to the EGR rate map in the supercharging range. Here, in the present embodiment, the EGR device 26 is configured such that the EGR gas can be appropriately introduced in the high load range R11 as the supercharging range. Specifically, in the present embodiment, the EGR passage 27 of the EGR device 26 and the like are configured to have a relatively large size so that a large amount of the EGR gas can be introduced in the supercharging range. Such a configuration of the EGR device 26 makes it difficult to properly perform the EGR control when attempting to introduce the EGR gas in the low load range R13. That is, it becomes difficult to ensure the controllability of the EGR rate. Specifically, the EGR rate greatly changes due to a change in the operating condition, causing unstable combustion and deteriorating emission.

Therefore, in the present embodiment, the EGR gas is not introduced in the low load range R13 (see FIG. 7). In this case, pumping loss cannot be reduced unless the EGR gas is introduced in the low load range R13. Therefore, in the present embodiment, while the EGR gas is not introduced in a low load range R13, alternatively, pumping loss is reduced by controlling the opening/closing timings of the intake valve 12 and the exhaust valve 17 of the engine.

Figure 8:
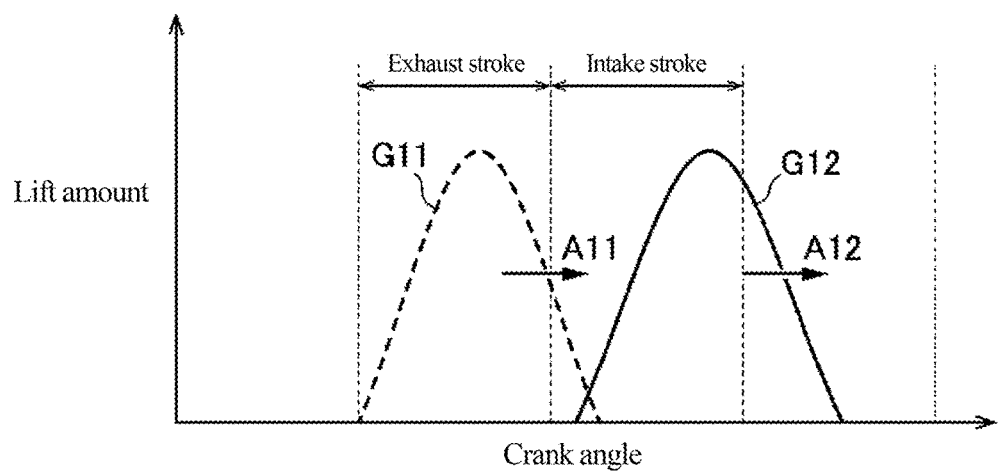
FIG. 8 is a graph showing an example of operation of an intake valve and an exhaust valve according to an embodiment of the present invention.
Figure 9A:
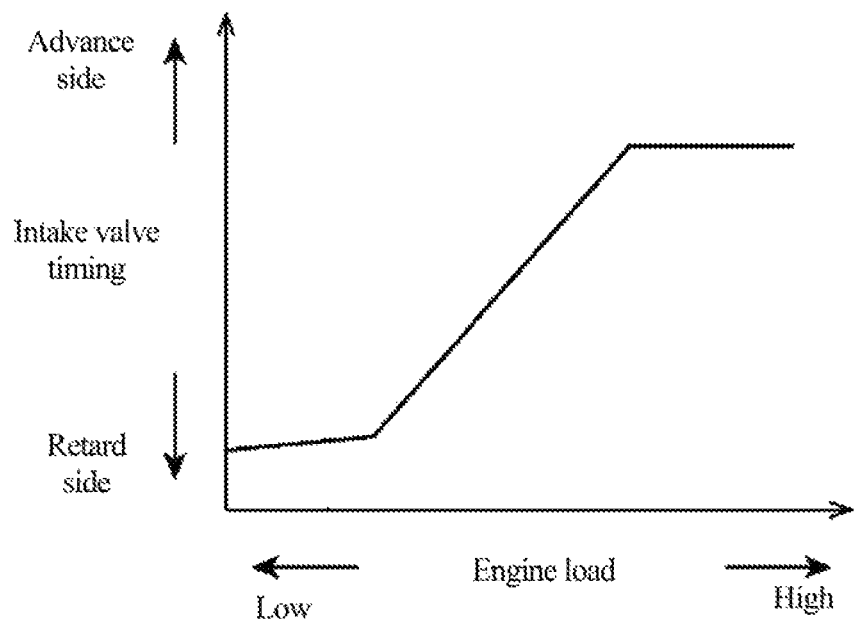
FIGS. 9A and 9B are maps defining operation timings of an intake valve and an exhaust valve according to an embodiment of the present invention.
Figure 9B:
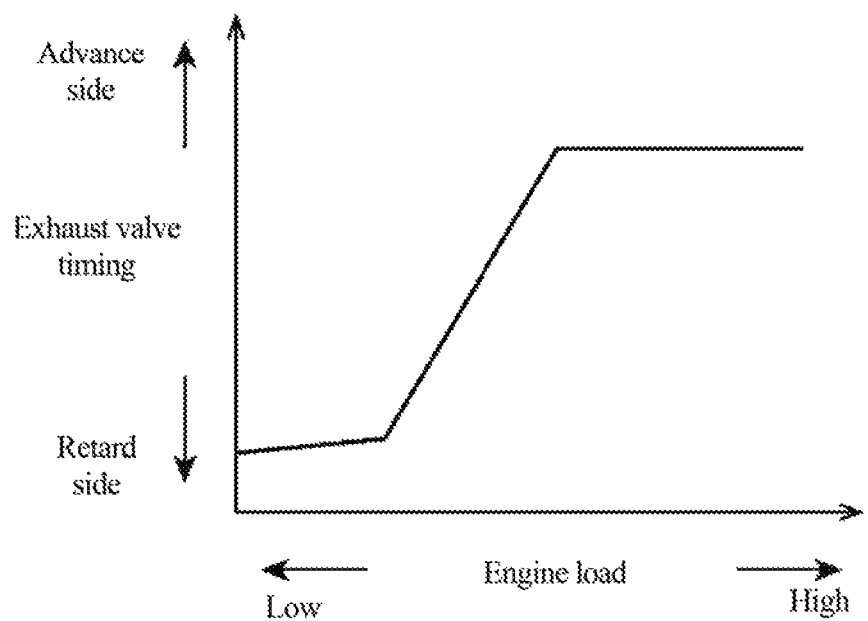

Control of the operation timings of the intake valve 12 and the exhaust valve 17 performed in an embodiment of the present invention will be specifically described with reference to FIGS. 8, 9(a), and 9(b). In FIG. 8, a horizontal axis indicates a crank angle and a vertical axis indicates a valve lift amount, and an operation of the exhaust valve 17 according to the crank angle (see graph G11) and an operation of the intake valve 12 according to the crank angle (see graph G12) are shown in an overlapping manner. In FIGS. 9(a) and 9(b), FIG. 9(a) shows a map defining an operation timing of the intake valve 12 according to the engine load, and FIG. 9(b) shows a map defining an operation timing of the exhaust valve 17 according to the engine load.

The intake valve 12 is operated via the variable intake valve timing mechanism 18 in accordance with the operation timing of the map shown in FIG. 9(a), while the exhaust valve 17 is operated via the variable exhaust valve timing mechanism 19 in accordance with the operation timing of the map shown in FIG. 9(b). Here, in the intake valve 12 and the exhaust valve 17, respectively, the variable intake valve timing mechanism 18 and the variable exhaust valve timing mechanism 19 change both a valve opening timing and a valve closing timing in conjunction with each other in a state where a valve opening time (a length of a valve opening period) is fixed. That is, both the valve opening timing and the valve closing timing are set to the retard side when the operation timing is set to the retard side, while both the valve opening timing and the valve closing timing are set to an advance side when the operation timing is set to the advance side.

As shown in FIGS. 9(a) and 9(b), in the present embodiment, the operation timings of the intake valve 12 and the exhaust valve 17 are set to the retard side in the low load range. As a result, in the low load range, the valve closing timing of the exhaust valve 17 is retarded (see an arrow A11 in FIG. 8), and the valve closing timing of the intake valve 12 is retarded (see an arrow A12 in FIG. 8). In the present embodiment, the PCM 60 thus retards the valve closing timing of the intake valve 12 while controlling the throttle valve 6 to an opening side. As a result, since the throttle valve 6 is on the opening side, the intake manifold pressure can be secured and pumping loss can be reduced, and a filling amount of the intake air can be appropriately controlled by adjusting the valve closing timing of the intake valve 12 on the retard side in this state. Further, retarding the valve closing timing of the exhaust valve 17 generates a valve overlap period between the exhaust valve 17 and the intake valve 12 during an intake stroke to introduce the internal EGR gas into the cylinder of the engine 10, enabling appropriate reduction of pumping loss similarly to the case where the external EGR gas is introduced as described above. Each of the opening degree of the throttle valve 6, the valve closing timing of the intake valve 12, and the valve closing timing of the exhaust valve 17 is preferably set to achieve the target filling amount and appropriately suppress pumping loss, in consideration of a balance between a fresh air quantity via the intake valve 12 and an internal EGR quantity via the exhaust valve 17.

Next, with reference to FIG. 10, the relationship between the engine speed and the EGR rate, which is defined in the EGR rate map according to an embodiment of the present invention, will be described. Specifically, FIG. 10 is a graph showing the relationship between the engine speed (horizontal axis) and the EGR rate (vertical axis) when viewed with a same engine load, relating to the EGR rate map.

Figure 10:
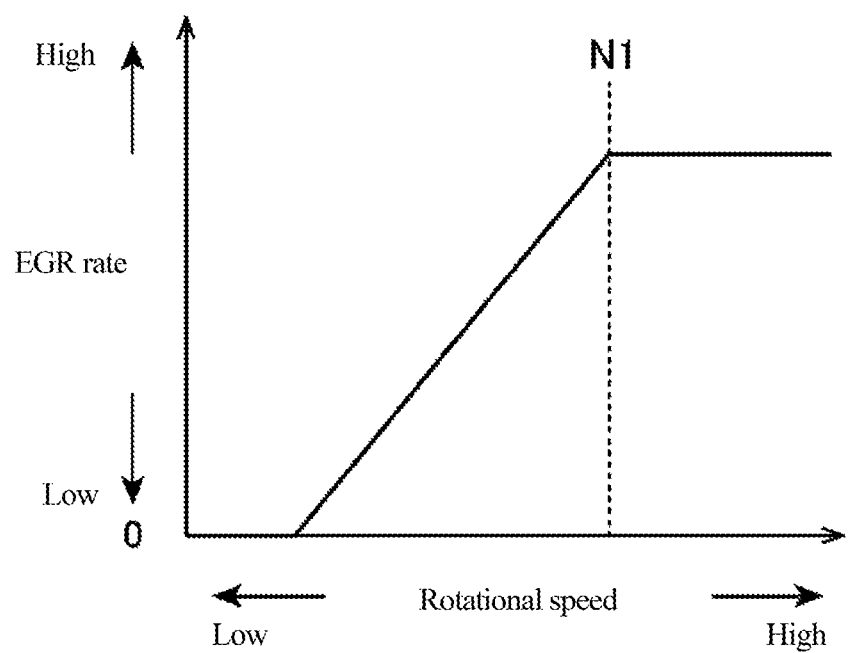
FIG. 10 is a graph showing a relationship between an engine speed and an EGR rate when viewed with a same engine load, relating to an EGR rate map according to an embodiment of the present invention.

As shown in FIG. 10, in the present embodiment, the EGR rate map is defined to increase the EGR rate as the engine speed increases, when viewed with a same engine load. Further in the present embodiment, the EGR rate map is defined such that the EGR rate becomes substantially constant regardless of the engine speed in a region where the engine speed is equal to or higher than a predetermined value N1.

The reason for defining the EGR rate map as shown in FIG. 10 is as follows. In a low rotation range of the engine 10, the exhaust pressure becomes low since the exhaust gas amount is small. Therefore, the EGR gas amount is desirably reduced from the viewpoint of emission and the like. On the other hand, when the engine speed increases, since the exhaust gas amount increases and the exhaust pressure increases, the EGR gas amount can be increased. Therefore, in the present embodiment, the EGR rate is increased as the engine speed increases (see FIG. 10). This can enhance a fuel efficiency improvement effect and a heat load reduction effect due to introduction of the EGR gas in a high rotation range, while lowering the EGR rate in the low rotation range, enabling suppression of deterioration of emission and the like caused by introduction of the EGR gas.

On the other hand, in the high rotation range where the engine speed is equal to or higher than the predetermined value N1, since the EGR rate greatly changes due to a change in the operating state, the controllability of the EGR rate tends to decrease. Specifically, deviation occurs between a control value and an actual value in the EGR control, and air-fuel ratio fluctuates, causing deterioration of emission and unstable combustion. Therefore, in the present embodiment, the EGR rate is made substantially constant regardless of the engine speed in the region where the engine speed is equal to or higher than the predetermined value N1 (see FIG. 10). This enables the controllability of the EGR rate to be secured to appropriately suppress deterioration of emission and combustion stability, while securing the fuel efficiency improvement effect and the heat load reduction effect due to introduction of the EGR gas, in the region where the engine speed is equal to or higher than the predetermined value N.

As shown in FIG. 10, the EGR rate is set to substantially 0 in the low rotation range, specifically, in the low rotation range near an idle rotation speed. Since such a rotation range is used less frequently, the EGR gas is not introduced in order to avoid disadvantage of introducing the EGR gas (deterioration of emission and combustion stability) rather than obtaining the advantage of introducing the EGR gas.

Figure 11:
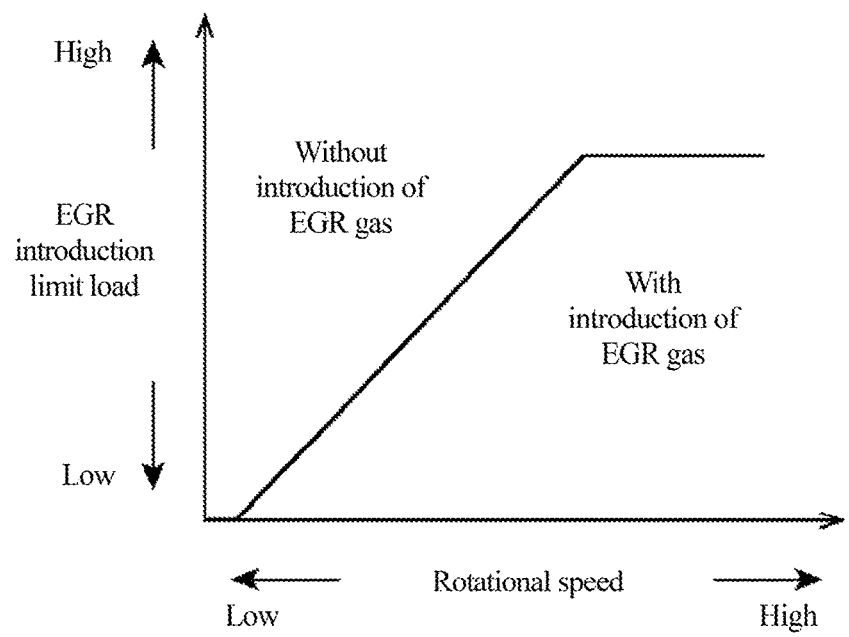
FIG. 11 is a graph showing a relationship between an engine speed and an EGR introduction limit load defined in an EGR rate map according to an embodiment of the present invention.

Next, with reference to FIG. 11, an engine load (EGR introduction limit load) to limit the introduction of EGR gas, which is defined in the EGR rate map according to an embodiment of the present invention, will be described. In the present embodiment, the EGR introduction limit load according to the engine speed is defined on the EGR rate map, and the introduction of the EGR gas is restricted in a region where the engine load is equal to or higher than the EGR introduction limit load. FIG. 11 is a graph showing the relationship between the engine speed (horizontal axis) and the EGR introduction limit load (vertical axis), which is defined in the EGR rate map.

As shown in FIG. 11, in the present embodiment, the EGR rate map is defined such that the EGR gas is not introduced in a region where the engine load is equal to or higher than the EGR introduction limit load (in this case, "EGR rate=0" is set), and the EGR gas is introduced in a region where the engine load is less than the EGR introduction limit load (in this case, the EGR rate is set to a value larger than 0). Further, in the present embodiment, the EGR rate map is defined such that the EGR introduction limit load increases as the engine speed increases. Therefore, as the engine speed increases, restriction on the introduction of the EGR gas is reduced, and a load range for introducing the EGR gas is widened.

The reason for defining the EGR rate map as shown in FIG. 11 is as follows. Especially in a low rotation and high load range where supercharging by the turbocharger 4 is performed, the exhaust pressure becomes relatively lower than the intake manifold pressure, which may cause backflow of the EGR gas when the EGR gas is introduced. Therefore, in the low rotation range, it is desirable to introduce the EGR gas after imposing restriction on the engine load. That is, the EGR gas is desirably introduced only in a region where the engine load is less than a certain load (specifically, a region not in the supercharging range). On the other hand, since the exhaust gas amount increases and the exhaust pressure increases when the engine speed increases, backflow of the EGR gas as described above is less likely to occur. Therefore, it is desirable to reduce the restriction imposed on engine load when introducing the EGR gas, that is, it is desirable to widen the region of the engine load for introducing the EGR gas. Therefore, in the present embodiment, the EGR introduction limit load is increased as the engine speed increases. By using such an EGR introduction limit load, introduction of the EGR gas can be restricted by the EGR introduction limit load to suppress the backflow of the EGR gas and the deterioration of emission that is caused by introduction of the EGR gas in the low rotation range, while such restriction on introduction of EGR gas can be reduced to appropriately introduce the EGR gas even in the supercharging range (high load range) in the high rotation range. Accordingly, the fuel efficiency improvement effect and the heat load reduction effect can be obtained.

<Operation and Effect>

Next, an operation and effect of the engine control device according to an embodiment of the present invention will be described.

In the present embodiment, the EGR gas is introduced at least in the high load range R11, and the EGR rate in the high load range R11 is made lower than that in the medium load range R12, at the same engine speed. This enables appropriate suppression of decrease in engine output and deterioration of combustion stability that are caused by the introduction of the EGR gas, by suppressing the EGR gas amount in the high load range R11 to a certain extent (specifically, the EGR rate in the high load range R11 is made lower than that in the medium load range R12) while appropriately securing the introduction of the EGR gas in the high load range R11, and appropriately realizing reduction in a temperature of the engine 10 (such as a temperature between the bores) and reduction in fuel increase for suppressing heat damage. Furthermore, introducing a relatively large amount of the EGR gas in the medium load range R12 enables reliable reduction of pumping loss and effective improvement of fuel efficiency. In addition, knocking can be suppressed by such introduction of the EGR gas, and as a result, a retarded ignition timing for suppressing knocking can be relieved. That is, the ignition timing can be advanced as compared with a case where EGR gas is not introduced. This also enables improvement of fuel efficiency.

In particular, in the present embodiment, the EGR gas is appropriately introduced in a region where it is desirable to introduce the EGR gas, such as the region on the high load and high rotation side, and the supercharging range. Therefore, in such a region, it is possible to appropriately realize knock suppression, heat load reduction, reduction in fuel increase, and the like.

Further, according to the present embodiment, since the EGR gas is not introduced in the low load range R13, it is possible to appropriately suppress deterioration of combustion stability and emission that may occur when the EGR gas is introduced in the low load range R13.

Further, according to the present embodiment, since the ignition timing is set to the retard side as the engine load increases, it is possible to appropriately execute the EGR control while suppressing knocking that may occur in the high load range.

<Modification>

In the above-described embodiment, the EGR rate is set to substantially 0 in the low load range R13, so as not to introduce the EGR gas (see FIG. 7). However, a small amount of the EGR gas (EGR gas with a lower flow rate than those in the high load range R11 and the medium load range R12) may be introduced without setting the EGR rate to 0 in the low load range R13.

Further, in the above-described embodiment, the EGR rate is set to be substantially constant regardless of the engine speed in the region where the engine speed is equal to or higher than the predetermined value N1 (see FIG. 10). However, the EGR rate may be increased according to the engine speed. In that case, the EGR rate map may be defined such that, in the region where the engine speed is equal to or higher than the predetermined value N1, a change degree in the EGR rate according to the engine speed (an increase rate of the EGR rate according to the increase in the engine speed) is smaller than that in a region where the engine speed is less than the predetermined value N1.

In the above-described embodiment, the EGR introduction limit load is set based on the engine speed. However, the EGR introduction limit load may be set based on a parameter other than the engine speed, in particular, based on a parameter representing the exhaust gas amount.

REFERENCE SIGNS LIST 1 intake passage
4 turbocharger
4a compressor
4b turbine
6 throttle valve
10 engine
12 intake valve
13 fuel injection valve
14 ignition plug
17 exhaust valve
25 exhaust passage
26 EGR device
27 EGR passage
28 EGR cooler
29 EGR valve
45, 49 pressure sensor
60 PCM
100 engine system

The invention claimed is:
1. An engine control device comprising:
a turbocharger including a compressor provided on an intake passage and a turbine provided on an exhaust passage;

an EGR device including an EGR passage connected to an upstream side of the turbine of the turbocharger and a downstream side of the compressor of the turbocharger to recirculate exhaust gas of the exhaust passage into the intake passage as EGR gas, an EGR valve that regulates an amount of the EGR gas passing through the EGR passage, and an EGR cooler that cools the EGR gas passing through the EGR passage; and an EGR control unit that controls the EGR valve to adjust an EGR rate that is a ratio of an EGR gas amount to a total amount of gas introduced into a cylinder of an engine based on an operating state of the engine, wherein the EGR control unit:

controls the EGR valve to recirculate the EGR gas into the intake passage with the EGR device in a first region on a high load side of the engine and a second region on a low load side with respect to the first region;

controls the EGR valve such that an EGR rate in the first region is lower than an EGR rate in the second region at a same engine speed; and controls the EGR valve such that as an engine load increases in the first region, the EGR rate is reduced by reducing a ratio of the amount of the EGR gas cooled by the EGR device to the total amount of gas introduced into the cylinder of the engine.

2. The engine control device according to claim 1, wherein the EGR control unit controls the EGR valve to recirculate the EGR gas into the intake passage with the EGR device also in a third region on a low load side with respect to the second region, and controls the EGR valve such that an EGR rate in the third region is lower than the EGR rates in the first and second regions at a same engine speed.

3. The engine control device according to claim 1, wherein the EGR control unit controls the EGR valve to be fully closed so as not to recirculate the EGR gas into the intake passage with the EGR device in the third region on the low load side with respect to the second region.

4. The engine control device according to claim 1, further comprising an ignition control unit that sets an ignition timing to a retard side as the engine load increases, to perform ignition control of the engine.

5. The engine control device according to claim 1, wherein the EGR control unit controls the EGR valve to recirculate the EGR gas into the intake passage with the EGR device in a region on a high load side and a high rotation side of the engine.

6. The engine control device according to claim 1, wherein the first region is included in a supercharging range by the turbocharger.

7. The engine control device according to claim 1, wherein
the EGR control unit controls the EGR valve such that as the engine load increases in the second region, the EGR rate is reduced; and
a rate of change of the EGR rate with respect to the engine load in the first region is higher than a rate of change of the EGR rate with respect to the engine load in the second region.

8. The engine control device according to claim 1, wherein the EGR control unit controls the EGR valve such that, at a same engine load:
in a region in which the engine speed is lower than a predetermined value, the EGR rate increases as the engine speed increases, and
in a region in which the engine speed is equal to or higher than the predetermined value, the EGR rate becomes constant.

9. An engine control device comprising:
a turbocharger including a compressor provided on an intake passage and a turbine provided on an exhaust passage, the exhaust passage including a portion located upstream of the turbine, the portion being divided into a first passage and a second passage;
an EGR device including an EGR passage connected to an upstream side of the turbine of the turbocharger and a downstream side of the compressor of the turbocharger to recirculate exhaust gas of the exhaust passage into the intake passage as EGR gas, an EGR valve that regulates an amount of the EGR gas passing through the EGR passage, and an EGR cooler that cools the EGR gas passing through the EGR passage;
an on-off valve provided on the first passage and configured to close in a low rotation region of an engine; and
an EGR control unit that controls the EGR valve to adjust an EGR rate that is a ratio of an EGR gas amount to a total amount of gas introduced into a cylinder of the engine based on an operating state of the engine, wherein the EGR control unit:

controls the EGR valve to recirculate the EGR gas into the intake passage with the EGR device in a first region on a high load side of the engine, a second region on a low load side with respect to the first region, and a third region on a low load side with respect to the second region; and controls the EGR valve such that an EGR rate in the first region is lower than an EGR rate in the second region and higher than an EGR rate in the third region at a same engine speed.

* * * * *